United States Patent
Sugawara

(10) Patent No.: US 10,008,949 B2
(45) Date of Patent: Jun. 26, 2018

(54) SWITCHING POWER SUPPLY WITH AN AUXILIARY SUPPLY VOLTAGE

(71) Applicant: Fuji Electric Co., Ltd., Kanagawa (JP)

(72) Inventor: Takato Sugawara, Nagano (JP)

(73) Assignee: FUJI ELECTRIC CO., LTD., Kanagawa (JP)

( * ) Notice: Subject to any disclaimer, the term of this patent is extended or adjusted under 35 U.S.C. 154(b) by 0 days. days.

(21) Appl. No.: 15/666,119

(22) Filed: Aug. 1, 2017

(65) Prior Publication Data

US 2018/0076724 A1 Mar. 15, 2018

(30) Foreign Application Priority Data

Sep. 15, 2016 (JP) ................. 2016-180130

(51) Int. Cl.
*H02M 3/335* (2006.01)
*H02H 7/12* (2006.01)

(52) U.S. Cl.
CPC ...... *H02M 3/33592* (2013.01); *H02H 7/1213* (2013.01)

(58) Field of Classification Search
CPC .......... H02M 3/33592; H02H 7/1213
See application file for complete search history.

(56) References Cited

U.S. PATENT DOCUMENTS

| 9,030,848 | B2 * | 5/2015 | Sato | H02M 3/33592 363/21.06 |
|---|---|---|---|---|
| 9,118,255 | B2 * | 8/2015 | Lin | H02M 3/33592 |
| 9,608,532 | B2 * | 3/2017 | Wong | H02M 3/33592 |
| 2016/0261200 | A1 * | 9/2016 | Yabuzaki | H02M 1/32 |

OTHER PUBLICATIONS

"Synchronous MOSFET Controller in SO8", Diodes Incorporated ZXGD3104N8 Datasheet, Nov. 2015 (Mentioned in paragraph Nos. 17 and 18 of the as-filed specification.).

* cited by examiner

*Primary Examiner* — Emily P Pham
(74) *Attorney, Agent, or Firm* — Chen Yoshimura LLP

(57) ABSTRACT

A switching power supply includes an output circuit connected to a secondary coil of a transformer via a secondary switching element and a synchronous rectification control circuit controlling ON/OFF of the secondary switching element based on a detected source-drain voltage of the secondary switching element. The synchronous rectification control circuit includes a voltage detection circuit detecting the source-drain voltage, a switch driving circuit switching the secondary switching element ON/OFF based on the detected source-drain voltage, an auxiliary power supply circuit generating an auxiliary supply voltage from said source-drain voltage, a voltage decrease detection circuit detecting an abnormal voltage drop in a DC output voltage of the output circuit, and a power supply switching circuit switching a power supply for the voltage detection circuit and switch driving circuit from the DC output voltage to the auxiliary supply voltage when the abnormal voltage drop is detected.

7 Claims, 7 Drawing Sheets

SWITCHING POWER SUPPLY WITH AN AUXILIARY SUPPLY VOLTAGE

BACKGROUND OF THE INVENTION

Technical Field

The present invention relates to a synchronous rectification switching power supply that generates a DC output voltage and in which a voltage induced in a secondary coil of a transformer is rectified and supplied to an output circuit by a synchronous rectification secondary switching element constituted by a MOSFET, for example.

Background Art

A switching power supply 1 such as that illustrated in FIG. 4, for example, is used as the power supply for various electronic devices. The switching power supply 1 includes a main switching element (such as a power MOSFET) 4 that is connected in series with a primary coil 3a of a transformer 3 to a DC input power supply 2. The switching power supply 1 further includes a synchronous rectification secondary switching element (MOSFET) 5 connected in series to a secondary coil 3b of the transformer 3, as well as an output circuit 6 that generates a DC output voltage Vout from a voltage induced in the secondary coil 3b of the transformer 3 as the main switching element 4 is switched ON and OFF.

Moreover, the DC input power supply 2 includes a diode bridge circuit DB that rectifies a commercial AC power source AC as well as an input capacitor Cin that smoothes the rectified output voltage and generates a DC input voltage Vin. Furthermore, the ON/OFF operation of the main switching element 4 is controlled by a power supply control IC 7 in order to control the current flowing through the primary coil 3a of the transformer 3. Here, an AC voltage induced in an auxiliary coil 3c of the transformer 3 is rectified and smoothed by a rectifying and smoothing circuit 8 constituted by a diode D and a capacitor C to produce a DC output voltage, which the power supply control IC 7 uses as a supply voltage Vcc.

When the main switching element 4 is switched ON, electrical energy supplied from the DC input power supply 2 accumulates in the primary coil 3a of the transformer 3. When the main switching element 4 is then switched OFF, the primary coil 3a of the transformer 3 releases the electrical energy stored therein, thereby inducing an AC voltage in the secondary coil 3b of the transformer 3.

Here, the synchronous rectification secondary switching element (MOSFET) 5 is switched ON and OFF by a synchronous rectification control circuit 9 and, while ON, rectifies and supplies the voltage induced in the secondary coil 3b of the transformer 3 to the output circuit 6. In the output circuit 6, the voltage supplied from the secondary coil 3b of the transformer 3 via the secondary switching element (MOSFET) 5 is smoothed by an output capacitor Cout to generate the DC output voltage Vout.

Moreover, the DC output voltage Vout from the output circuit 6 is divided by resistors Ra and Rb and detected as an output voltage vout. An error voltage detection circuit E calculates the error voltage between a reference voltage generated by the error voltage detection circuit E to evaluate the DC output voltage Vout and the output voltage vout that is detected by the resistors Ra and Rb. This error voltage is then fed back to the power supply control IC 7 via a photocoupler PC. The power supply control IC 7 controls the ON/OFF operation of the main switching element 4 such that this error voltage that is fed back as described above is equal to zero, thus resulting in generation of a fixed DC output voltage Vout.

As illustrated in FIG. 5, for example, the typical conventional synchronous rectification control circuit 9 includes a VD detection circuit (voltage detection circuit) 9a that detects a voltage Vsd between the source and drain of the secondary switching element MOSFET 5. Here, the voltage Vsd between the source and drain of the MOSFET 5 is equal to the drain voltage VD of the MOSFET 5 because the source is grounded. The VD detection circuit 9a detects the value of this drain voltage VD in order to detect the drain current Id flowing through the MOSFET 5. Furthermore, the synchronous rectification control circuit 9 includes a switch driving circuit 9b that receives the output from the VD detection circuit 9a and controls the ON/OFF operation of the secondary switching element (MOSFET) 5.

The synchronous rectification control circuit 9 further includes a voltage decrease detection circuit 9c that detects decreases in the DC output voltage Vout associated with output short-circuits. Upon detecting a voltage decrease in the DC output voltage Vout (the output voltage vout), the voltage decrease detection circuit 9 outputs an output signal uvlo to stop the operation of the switch driving circuit 9b and thereby forcibly switch the secondary switching element (MOSFET) 5 OFF.

Next, the role of the synchronous rectification control circuit 9 in controlling the ON/OFF operation of the synchronous rectification secondary switching element (MOSFET) 5 will be described in more detail.

When the main switching element 4 is in the ON state, no voltage is induced in the secondary coil 3b of the transformer 3, and the secondary switching element (MOSFET) 5 is reverse-biased by the charge voltage of the output capacitor Cout. Therefore, a positive voltage (drain voltage VD) is built up between the source and drain of the MOSFET 5, and the synchronous rectification control circuit 9 maintains the gate voltage VG of the MOSFET 5 at a low level to keep the MOSFET 5 in the OFF state (as will be described later).

When the main switching element 4 is then switched OFF, a voltage is induced in the secondary coil 3b of the transformer 3. Moreover, the voltage induced in the secondary coil 3b causes a drain current Id to begin flowing through the MOSFET 5. More specifically, this drain current Id begins flowing through a body diode (parasitic diode) 5a in the MOSFET 5 that is present due to the device structure of the MOSFET 5. The drain current Id flowing through the body diode (parasitic diode) 5a creates a negative source-drain voltage Vds between the source and drain of the MOSFET 5 (in which the source is grounded). As illustrated in FIG. 6, this negative source-drain voltage Vds causes the drain voltage VD of the MOSFET 5 to become negative.

The VD detection circuit 9a compares the negative drain voltage VD (drain voltage value) to a first threshold voltage Vth1, and when the absolute value of the drain voltage VD becomes greater than the absolute value of the first threshold voltage Vth1, the VD detection circuit 9a detects that the drain current Id has begun to flow through the MOSFET 5 (time t1). Then, the switch driving circuit 9b receives this detection output from the VD detection circuit 9a and sets the gate voltage VG applied to the MOSFET 5 to a high level to switch the MOSFET 5 ON. As a result, the voltage induced in the secondary coil 3b of the transformer 3 is applied across the MOSFET 5, and charges and is smoothed by the output capacitor Cout.

Meanwhile, while the MOSFET 5 is ON, the synchronous rectification control circuit 9 monitors the drain current Id. More specifically, the VD detection circuit 9a monitors the drain voltage VD of the MOSFET 5, and when the absolute value of the drain voltage VD becomes less than the absolute value of a second threshold voltage Vth2 (where |Vth2|<|Vth1|), the VD detection circuit 9a detects that the drain current Id has substantially stopped flowing through the MOSFET 5 (time t2).

Then, the switch driving circuit 9b receives this detection output from the VD detection circuit 9a and sets the gate voltage VG applied to the MOSFET 5 to the low level to switch the MOSFET 5 OFF. As a result, the drain current Id that flows through the MOSFET 5 due to the voltage induced in the secondary coil 3b of the transformer 3 once again begins to flow through the body diode (parasitic diode) 5a of the MOSFET 5.

Next, when the main switching element 4 is switched ON, the MOSFET 5 is reverse-biased once again, and the drain voltage VD of the MOSFET 5 returns to being a positive value. Here, the VD detection circuit 9a detects that the drain current Id has stopped flowing through the MOSFET 5 due to the main switching element 4 being in the ON state. As a result, the switch driving circuit 9b maintains the gate voltage VG of the MOSFET 5 at the low level to keep the MOSFET 5 in the OFF state.

In this way, the synchronous rectification control circuit 9 configured as described above makes it possible to switch the MOSFET 5 ON and OFF in synchronization with the ON/OFF operation of the main switching element 4 during periods in which the drain current Id flows through the MOSFET 5. More specifically, this makes it possible to switch the MOSFET 5 ON only when the main switching element 4 is not in the ON state (that is, only when electrical energy is being transmitted to the secondary coil 3b of the transformer 3). This, in turn, makes it possible to efficiently rectify the voltage induced in the secondary coil 3b while also reducing switching loss when the MOSFET 5 is switched ON and OFF.

Non-Patent Document 1, for example, describes such a configuration of the synchronous rectification control circuit 9 in detail.

RELATED ART DOCUMENT

Non-Patent Document

Non-Patent Document 1: Diodes Incorporated ZXGD3104N8 Datasheet, November 2015

SUMMARY OF THE INVENTION

Here, as illustrated in FIG. 5, the VD detection circuit 9a and the switch driving circuit 9b of the synchronous rectification control circuit 9 operate using the DC output voltage Vout applied to the synchronous rectification control circuit 9, for example, as a supply voltage Vcc. Moreover, as described above, the synchronous rectification control circuit 9 includes the voltage decrease detection circuit 9c, which protects the switching power supply 1 from overcurrents caused by short-circuits (output short-circuits) that occur on the load side (not illustrated in the figure). Upon detecting an abnormal decrease in the DC output voltage Vout, the voltage decrease detection circuit 9c stops the operation of the switch driving circuit 9b to forcibly switch the MOSFET 5 OFF.

However, as illustrated in FIG. 7, for example, if the synchronous rectification control circuit 9 loses the supply voltage Vcc due to an output short-circuit, the gate voltage VG remains at the low level and the MOSFET 5 cannot be switched ON even though the main switching element 4 continues to switch ON and OFF. When this happens, the drain current Id continues to flow through the body diode (parasitic diode) 5a of the MOSFET 5 even when the main switching element 4 is switched OFF and a voltage is induced in the secondary coil 3b of the transformer 3.

Moreover, the resistance of the body diode (parasitic diode) 5a is significantly greater than the on-resistance (channel resistance) of the MOSFET 5. As a result, if the drain current Id continues to flow through the body diode (parasitic diode) 5a when the main switching element 4 is OFF, the conduction resistance of the MOSFET 5 increases. Therefore, the drain current Id that continues to flow through the body diode (parasitic diode) 5a causes the MOSFET 5 to generate heat, which in the worst cases can result in thermal destruction of the MOSFET 5.

The present invention was made in light of the foregoing and aims to provide a synchronous rectification switching power supply that, even when the DC output voltage decreases due to a short-circuit, makes it possible to switch a synchronous rectification secondary switching element ON and OFF in the same manner as during normal operation and also makes it possible to prevent heat generation and damage in the synchronous rectification secondary switching element. Accordingly, the present invention is directed to a scheme that substantially obviates one or more of the problems due to limitations and disadvantages of the related art.

Additional or separate features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, in one aspect, the present disclosure provides a switching power supply, including:
a transformer having a primary coil and a secondary coil;
a main switching element connected in series to the primary coil of the transformer, one end of a series circuit of the main switching element and the primary coil being configured to be connected to a DC input power supply;
an output circuit that is connected to a secondary coil of the transformer via a secondary switching element and that generates a DC output voltage from a voltage induced in the secondary coil of the transformer as the main switching element is switched ON and OFF; and a synchronous rectification control circuit that controls ON/OFF operation of the secondary switching element in accordance with a voltage across a source and a drain of the secondary switching element.

More specifically, in order to achieve the abovementioned objectives, the synchronous rectification control circuit of the switching power supply according to one aspect of the present invention includes:
a voltage detection circuit that detects the voltage across the source and the drain of the secondary switching element;
a switch driving circuit that switches the secondary switching element ON and OFF in accordance with the voltage detected by the voltage detection circuit;

an auxiliary power supply circuit that is configured to be connected to a power storage device and that generates an auxiliary supply voltage by charging the power storage device by the voltage across the source and drain of the secondary switching element;

a voltage decrease detection circuit that detects an abnormal voltage drop in the DC output voltage generated by the output circuit and that outputs a voltage decrease detection signal when the abnormal voltage drop is detected; and a power supply switching circuit that selectively supplies one of the DC output voltage and the auxiliary supply voltage to both of the voltage detection circuit and the switch driving circuit as a power supply therefor, the power supply switching circuit switching the power supply of the voltage detection circuit and the switch driving circuit from the DC output voltage to the auxiliary supply voltage when the voltage decrease detection signal is output from the voltage decrease detection circuit.

It is preferable that the auxiliary power supply circuit include the power storage device, and that the auxiliary power supply circuit include a current supply circuit that charges the power storage device by the voltage across the source and the drain of the secondary switching element only when the voltage across the source and the drain of the secondary switching element exceeds a prescribed reference voltage, for example. Moreover, the power supply switching circuit may include a power supply switch that receives the voltage decrease detection signal and then outputs one of the DC output voltage and the auxiliary supply voltage, for example.

Furthermore, the secondary switching element may be a MOSFET and the source of the secondary switching element may be grounded, for example. More specifically, the synchronous rectification control circuit may switch the MOSFET ON when the voltage across the source and the drain of the MOSFET exceeds a first threshold voltage and, when the voltage across the source and the drain of the MOSFET becomes less than a second threshold voltage, may switch the MOSFET OFF to rectify the voltage induced in the secondary coil of the transformer.

In addition, the first threshold voltage may be a threshold value for detecting that a source-drain current has begun flowing through the MOSFET, and the second threshold voltage may be a threshold value for detecting that the source-drain current flowing through the MOSFET has become zero.

The switching power supply may further include the DC input power supply configured to be connected to a commercial AC power source, the DC input power supply rectifying and smoothing AC power received from the commercial AC power source so as to generate a DC input voltage that is applied to the primary coil of the transformer through the main switching element, and the main switching element, when ON, may store electrical energy supplied from the DC input power supply in the primary coil of the transformer and then, when OFF, release the electrical energy stored in the primary coil of the transformer to induce a voltage in the secondary coil of the transformer.

In the switching power supply configured as described above, when the DC output voltage decreases due to an output short-circuit on the load side, the power supply for the voltage detection circuit and the switch driving circuit (the primary components) of the synchronous rectification control circuit is switched from the DC output voltage to the auxiliary supply voltage. This allows the synchronous rectification control circuit to continue operating and switching the secondary switching element (MOSFET) ON and OFF in the same manner as during normal operation even when a short-circuit is detected in the form of a decrease in the DC output voltage.

In this way, the secondary switching element (MOSFET) can be reliably switched ON and OFF while the main switching element is OFF even after the DC output voltage decreases due to an output short-circuit. This makes it possible to avoid the situation in which the drain current Id continues to flow through the body diode (parasitic diode) of the secondary switching element (MOSFET). This, in turn, makes it possible to reliably prevent undesirable increases in conduction loss in the secondary switching element (MOSFET).

Moreover, the present invention makes it possible to easily generate the auxiliary supply voltage using the drain voltage of the secondary switching element (MOSFET) and thus simply has to switch between the DC output voltage and the auxiliary supply voltage using the power supply switching circuit, thereby yielding advantages such as simplifying the overall configuration. It is to be understood that both the foregoing general description and the following detailed description are exemplary and explanatory, and are intended to provide further explanation of the invention as claimed.

DETAILED DESCRIPTION OF EMBODIMENTS

Next, a synchronous rectification switching power supply according to the present invention will be described with reference to figures.

Figure 1:
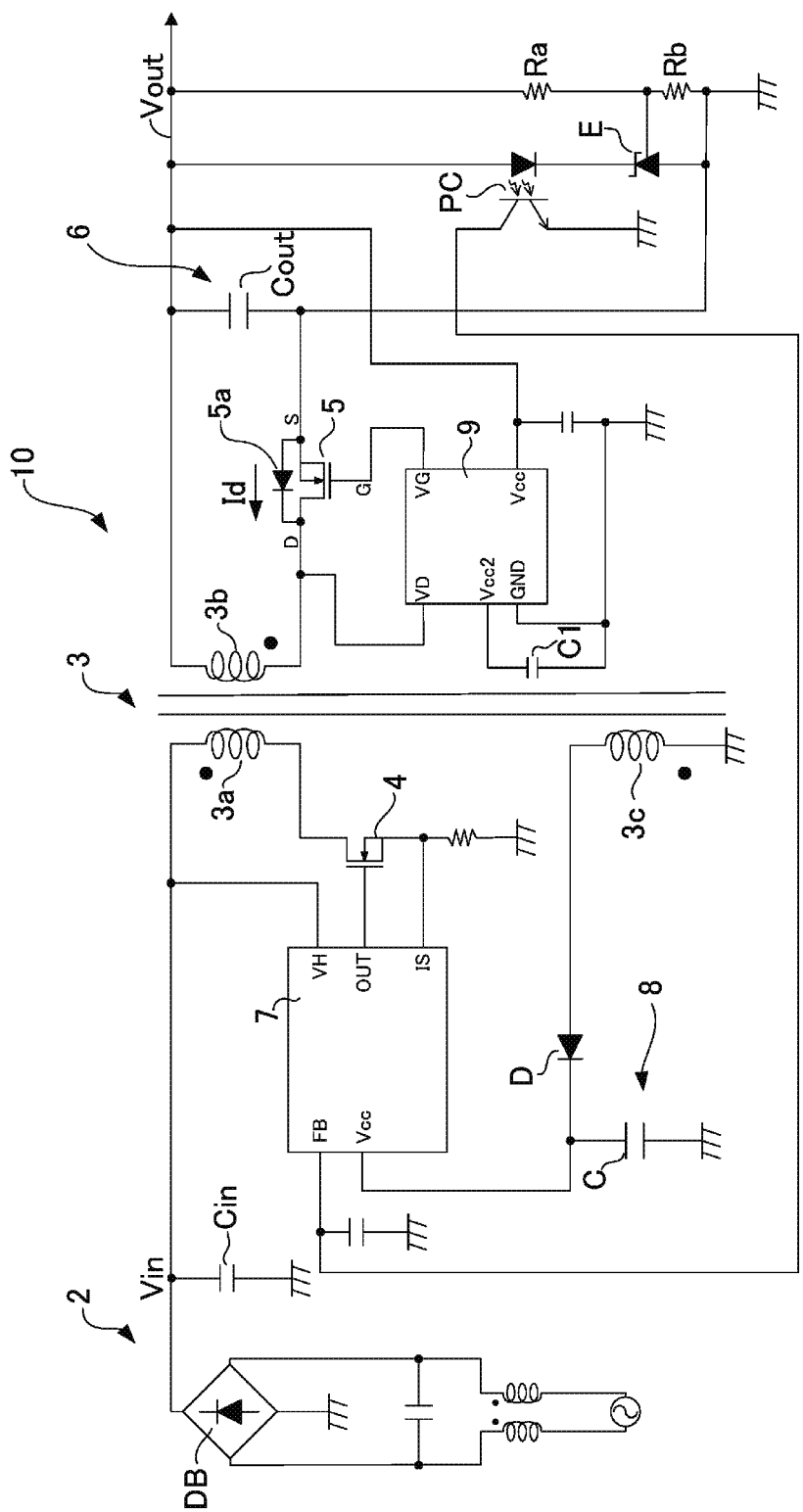
FIG. 1 illustrates an overall configuration of a synchronous rectification switching power supply according to an embodiment of the present invention.
Figure 2:
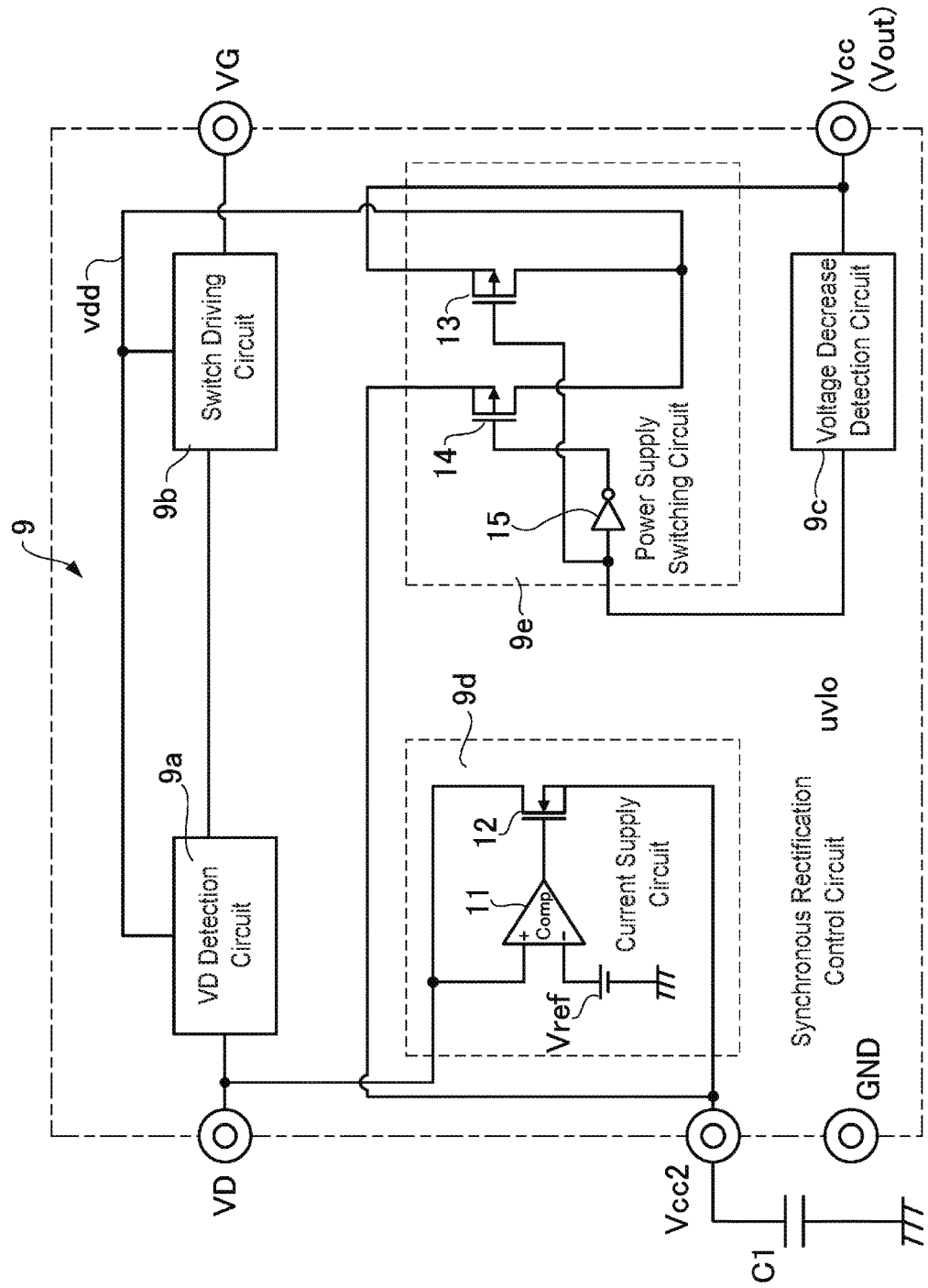
FIG. 2 illustrates an example of a configuration of a synchronous rectification control circuit for the switching power supply illustrated in FIG. 1.
Figure 4:
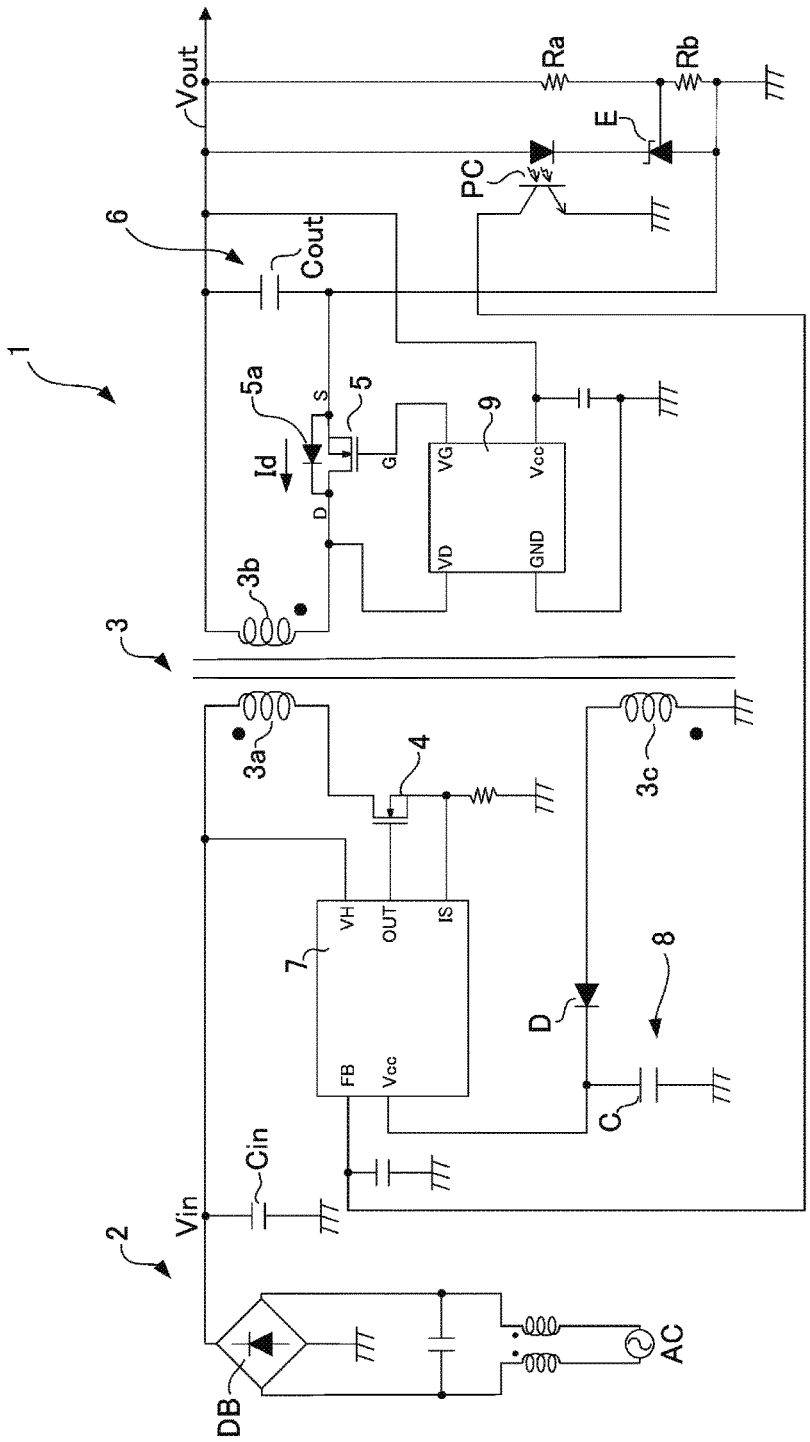
FIG. 4 is a block diagram schematically illustrating an example of a conventional synchronous rectification switching power supply.
Figure 5:
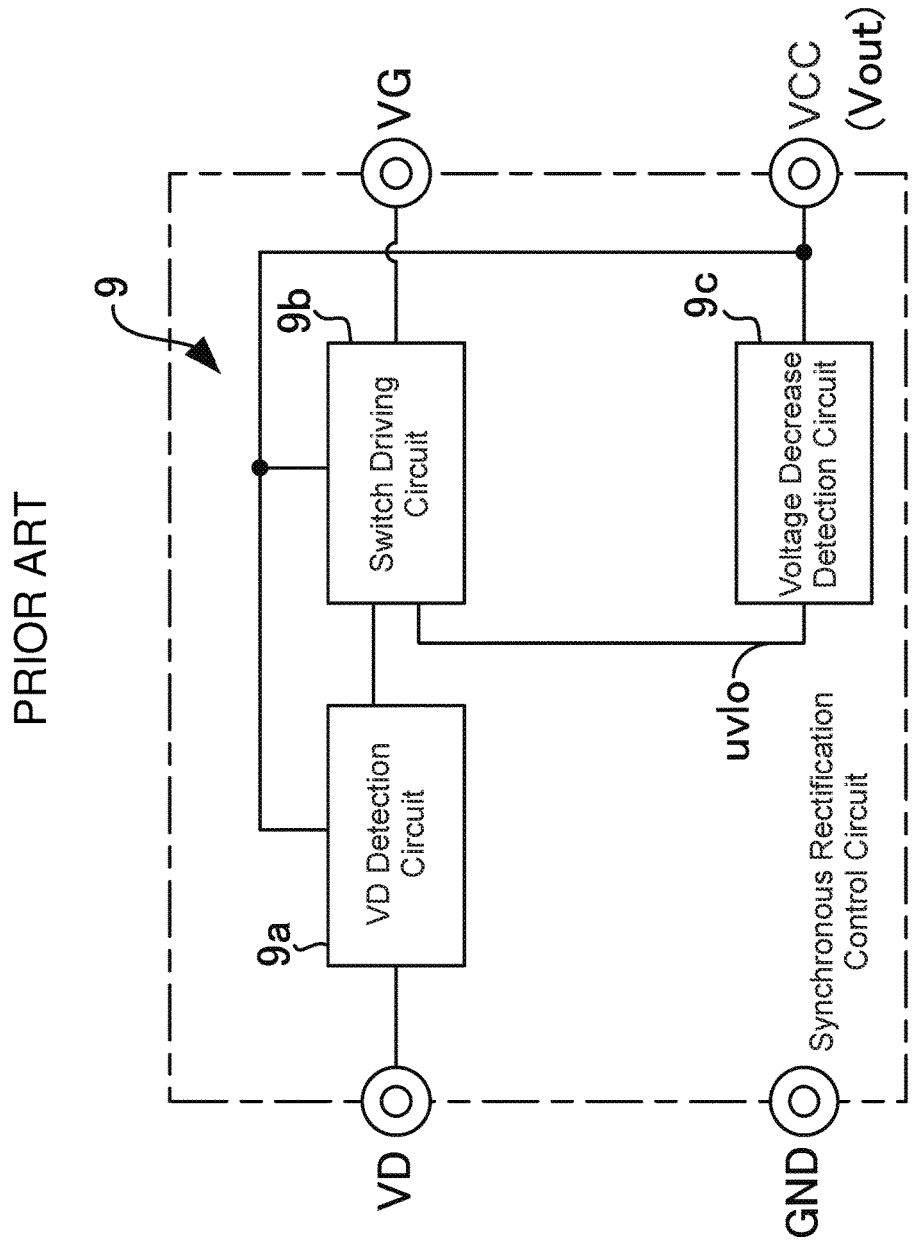
FIG. 5 illustrates an example of a configuration of a synchronous rectification control circuit for the switching power supply illustrated in FIG. 4.
Figure 6:
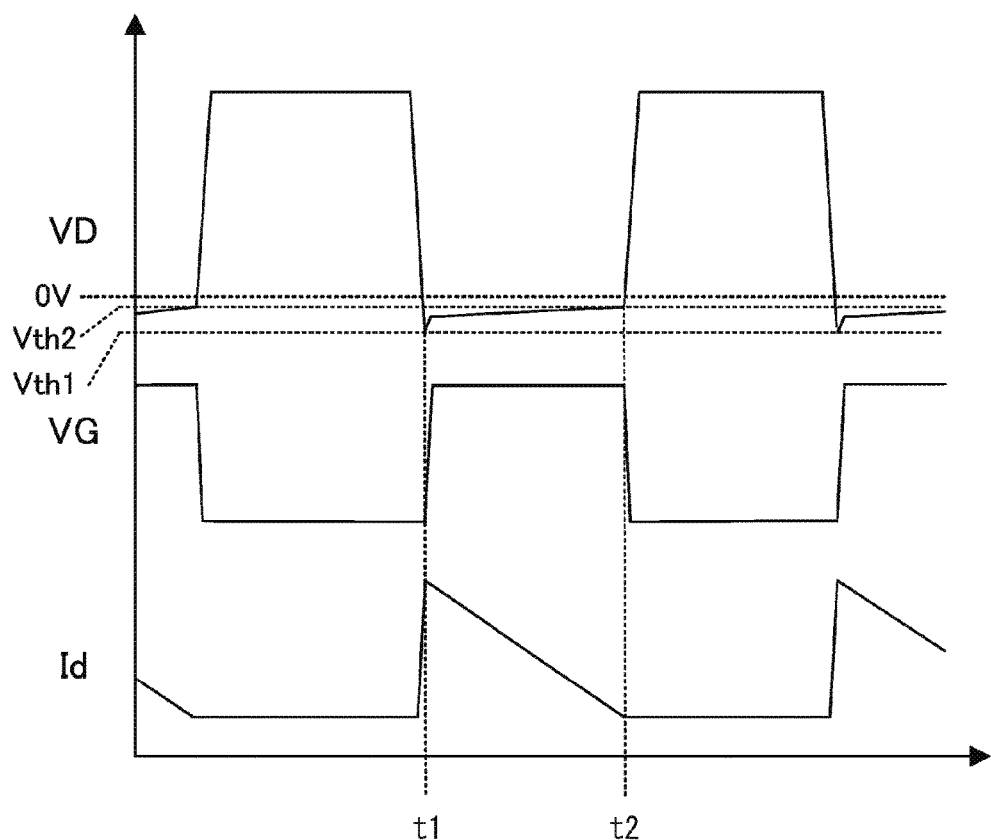
FIG. 6 is a timing diagram illustrating the operation of the synchronous rectification control circuit illustrated in FIG. 5 during normal operation.
Figure 7:
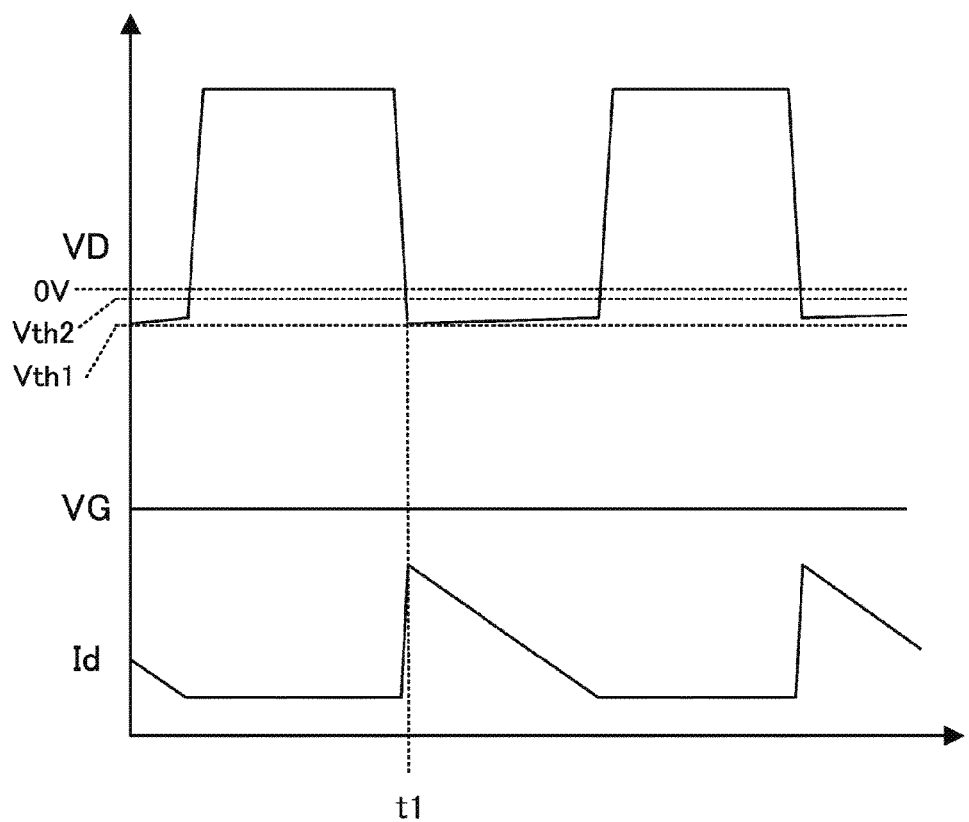
FIG. 7 is a timing diagram illustrating the operation of the synchronous rectification control circuit illustrated in FIG. 5 when an output short-circuit occurs.

FIG. 1 illustrates an overall configuration of a switching power supply 10 according to an embodiment of the present invention, and FIG. 2 illustrates an example of a characteristic configuration of a synchronous rectification control circuit 9 for the switching power supply 10 illustrated in FIG. 1. Note that the same reference characters are used for components that are the same as in the conventional switching power supply 1 illustrated in FIG. 4 and the conventional synchronous rectification control circuit 9 illustrated in FIG. 5, and descriptions of those components are omitted here.

The switching power supply 10 according to the embodiment of the present invention is characterized in that, as illustrated in FIG. 2, the synchronous rectification control circuit 9 includes a current supply circuit (auxiliary power supply circuit) 9d and a power supply switching circuit 9e in addition to the VD detection circuit 9a, the switch driving circuit 9b, and the voltage decrease detection circuit 9c described above.

The current supply circuit 9d includes a comparator 11 that compares the drain voltage VD of a MOSFET (secondary switching element) 5 to a prescribed reference voltage Vref. Moreover, when the drain voltage VD (drain voltage value) exceeds the reference voltage Vref, the output of the comparator 11 switches a current switch (MOSFET) 12 ON, thereby allowing the current supply circuit 9d to use the drain voltage VD to charge a capacitor C1 in a power storage device that is externally connected to the synchronous rectification control circuit 9. The current supply circuit (auxiliary power supply circuit) 9d thus generates an auxiliary supply voltage Vcc2 as the charge voltage of the capacitor C1.

Meanwhile, the power supply switching circuit 9e receives the output (a voltage decrease detection signal) from the voltage decrease detection circuit 9c and includes a power supply switch constituted by first and second power supply switches 13 and 14 that are alternately switched ON and OFF via an inverting circuit 15. The first and second power supply switches 13 and 14 are MOSFETs, for example. The first power supply switch 13 is switched ON when the output voltage of the voltage decrease detection circuit 9c is at a low level (that is, during normal operation when no decrease in the DC output voltage Vout (Vcc) has been detected). In this state, the DC output voltage Vout (Vcc) is supplied to the VD detection circuit 9a and the switch driving circuit 9b as a supply voltage vdd.

In contrast, when the DC output voltage Vout decreases due to an output short-circuit and the output voltage of the voltage decrease detection circuit 9c changes to a high level, the second power supply switch 14 is switched ON instead of the first power supply switch 13. In this state, instead of the DC output voltage Vout, the auxiliary supply voltage Vcc2 stored in the capacitor C1 is supplied to the VD detection circuit 9a and the switch driving circuit 9b as the supply voltage vdd.

Figure 3:
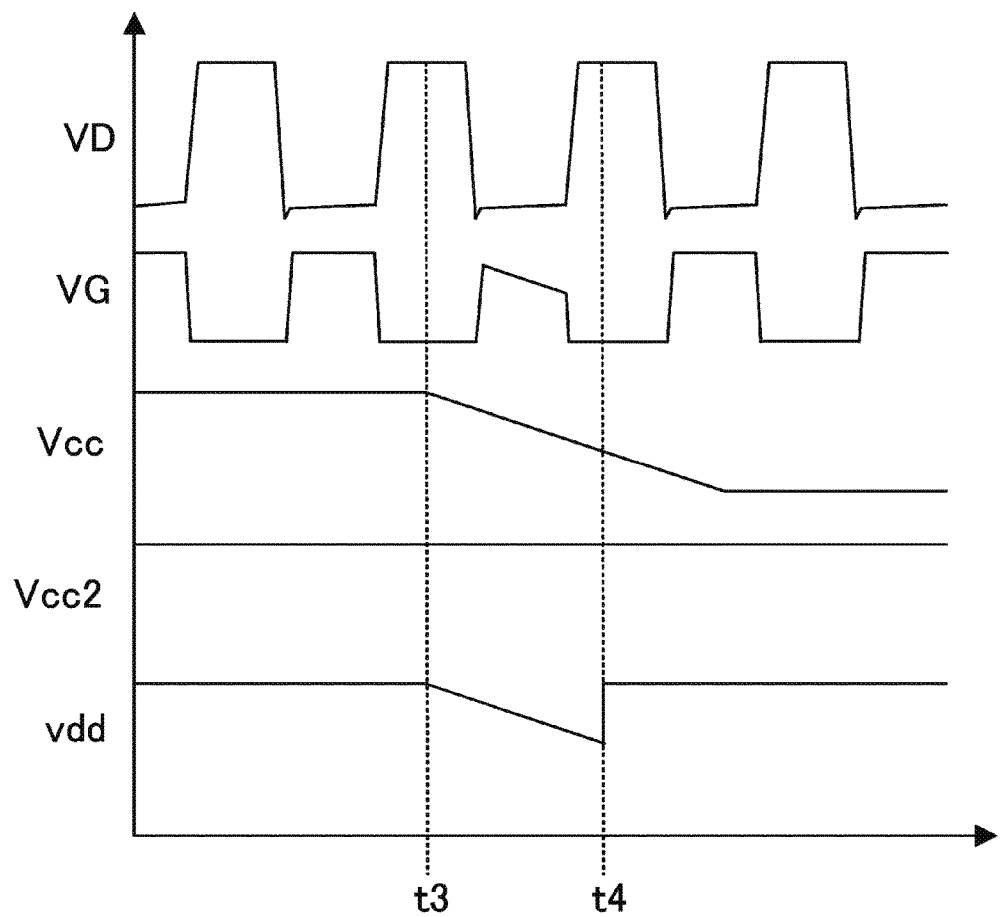
FIG. 3 is a timing diagram illustrating the operation of the synchronous rectification control circuit illustrated in FIG. 2.

Therefore, if, as illustrated at time t3 in FIG. 3, the DC output voltage Vout (Vcc) decreases due to an output short-circuit that occurs while the MOSFET 5 is OFF, the auxiliary supply voltage Vcc2 is supplied to the VD detection circuit 9a and the switch driving circuit 9b instead of the DC output voltage Vout, as illustrated at time t4. In this way, the VD detection circuit 9a and the switch driving circuit 9b receive the auxiliary supply voltage Vcc2 and continue operating. As a result, similar to during normal operation, the MOSFET 5 is switched OFF when the drain current Id that flows through the MOSFET 5 decreases. Therefore, even when a main switching element 4 is switched ON after an output short-circuit occurs, the drain current Id never continues flowing through a body diode (parasitic diode) 5a of the MOSFET 5 indefinitely as described above.

This makes it possible to effectively prevent the situation in which the drain current Id continues to flow through the body diode (parasitic diode) 5a of the MOSFET 5 and causes the MOSFET 5 to generate heat, which in the worst cases can result in thermal destruction of the MOSFET 5.

Moreover, the synchronous rectification control circuit 9 as described above has a simple configuration that includes the current supply circuit 9d used to generate the auxiliary supply voltage Vcc2 as well as the power supply switching circuit 9e that switches the supply voltage vdd for the VD detection circuit 9a and the switch driving circuit 9b from the DC output voltage Vout (Vcc) to the auxiliary supply voltage Vcc2 when the DC output voltage Vout decreases.

This configuration makes it possible to continue switching the MOSFET 5 ON and OFF even when the main switching element 4 is switched to the ON state after an output short-circuit has been detected.

This makes it possible to reliably prevent the situation in which the drain current Id continues flowing through the body diode (parasitic diode) 5a of the MOSFET 5 after an output short-circuit occurs. This, in turn, makes it possible to prevent the drain current Id that flows through the body diode (parasitic diode) 5a from causing the MOSFET 5 to generate heat and potentially suffer thermal destruction, which has significant advantages in practical applications.

It should be noted that the present invention is not limited to the embodiment described above. For example, a battery may be included instead of the current supply circuit 9d as the auxiliary power supply circuit for generating the auxiliary supply voltage Vcc2. Moreover, the power supply control IC that switches the main switching element 4 ON and OFF may use any of a variety of conventional control schemes as appropriate, and an IGBT may be used as the main switching element 4. In addition, various other modifications may be made without departing from the spirit of the present invention. It will be apparent to those skilled in the art that various modifications and variations can be made in the present invention without departing from the spirit or scope of the invention. Thus, it is intended that the present invention cover modifications and variations that come within the scope of the appended claims and their equivalents. In particular, it is explicitly contemplated that any part or whole of any two or more of the embodiments and their modifications described above can be combined and regarded within the scope of the present invention.

What is claimed is:

1. A switching power supply, comprising:
a transformer having a primary coil and a secondary coil;
a main switching element connected in series to the primary coil of the transformer, one end of a series circuit of the main switching element and the primary coil being configured to be connected to a DC input power supply;
an output circuit that is connected to a secondary coil of the transformer via a secondary switching element and that generates a DC output voltage from a voltage induced in the secondary coil of the transformer as the main switching element is switched ON and OFF; and
a synchronous rectification control circuit that controls ON/OFF operation of the secondary switching element in accordance with a voltage across a source and a drain of the secondary switching element,
wherein the synchronous rectification control circuit includes:
a voltage detection circuit that detects the voltage across the source and the drain of the secondary switching element;
a switch driving circuit that switches the secondary switching element ON and OFF in accordance with the voltage detected by the voltage detection circuit;
an auxiliary power supply circuit that is configured to be connected to a power storage device and that generates an auxiliary supply voltage by charging said power storage device by the voltage across the source and drain of the secondary switching element;
a voltage decrease detection circuit that detects an abnormal voltage drop in the DC output voltage generated by the output circuit and that outputs a voltage decrease detection signal when the abnormal voltage drop is detected; and a power supply switching circuit that selectively supplies one of the DC output voltage and the auxiliary supply voltage to both of the voltage detection circuit and the switch driving circuit as a power supply therefor, the power supply switching circuit switching the power supply of the voltage detection circuit and the switch driving circuit from the DC output voltage to the auxiliary supply voltage when the voltage decrease detection signal is output from the voltage decrease detection circuit.

2. The switching power supply according to claim 1, wherein the auxiliary power supply circuit includes said power storage device, and
wherein the auxiliary power supply circuit comprises a current supply circuit that charges the power storage device by the voltage across the source and the drain of the secondary switching element only when the voltage across the source and the drain of the secondary switching element exceeds a prescribed reference voltage.

3. The switching power supply according to claim 1, wherein the power supply switching circuit includes a power supply switch that receives the voltage decrease detection signal and then outputs one of the DC output voltage and the auxiliary supply voltage.

4. The switching power supply according to claim 1, wherein the secondary switching element is a MOSFET and the source of the secondary switching element is grounded.

5. The switching power supply according to claim 4, wherein the synchronous rectification control circuit switches the MOSFET ON when the voltage across the source and the drain of the MOSFET exceeds a first threshold voltage and, when the voltage across the source and the drain of the MOSFET becomes less than a second threshold voltage, switches the MOSFET OFF to rectify the voltage induced in the secondary coil of the transformer.

6. The switching power supply according to claim 5, wherein the first threshold voltage is a threshold value for detecting that a source-drain current has begun flowing through the MOSFET, and
wherein the second threshold voltage is a threshold value for detecting that the source-drain current flowing through the MOSFET has become zero.

7. The switching power supply according to claim 1, further comprising:
said DC input power supply configured to be connected to a commercial AC power source, said DC input power supply rectifying and smoothing AC power received from the commercial AC power source so as to generate a DC input voltage that is applied to the primary coil of the transformer through the main switching element, and
wherein the main switching element, when ON, stores electrical energy supplied from the DC input power supply in the primary coil of the transformer and then, when OFF, releases the electrical energy stored in the primary coil of the transformer to induce a voltage in the secondary coil of the transformer.

* * * * *